United States Patent [19]

Shigehisa

[11] Patent Number: 5,002,453
[45] Date of Patent: Mar. 26, 1991

[54] GREEN CORES COLLECTING APPARATUS

[75] Inventor: Honda Shigehisa, Tokyo, Japan

[73] Assignee: T.G.Y. Company Ltd., Tokyo, Japan

[21] Appl. No.: 422,016

[22] Filed: Oct. 16, 1989

[30] Foreign Application Priority Data

Nov. 8, 1988 [JP] Japan .................................. 63-280352

[51] Int. Cl.⁵ ............................................. B65G 67/02
[52] U.S. Cl. ..................................... 414/502; 172/22; 172/30; 172/33; 414/528
[58] Field of Search ............... 414/501, 502, 505, 523, 414/528, 486, 488, 435, 437, 401; 198/311, 313, 317, 520, 510.1; 172/22, 30, 33; 280/460.1, 413

[56] References Cited

U.S. PATENT DOCUMENTS

| | | | |
|---|---|---|---|
| 1,230,374 | 6/1917 | Brown et al. | 198/311 |
| 1,287,094 | 12/1918 | Pratt | 198/311 X |
| 1,554,972 | 9/1925 | Merwin | 414/502 |
| 2,179,586 | 11/1939 | Carpenter | 280/460.1 |
| 2,800,237 | 7/1957 | Kutscha | 414/505 |
| 3,134,480 | 5/1964 | Loosli | 198/311 X |
| 3,920,077 | 11/1975 | Van der Lely | 172/33 |
| 4,037,981 | 7/1977 | Wirtgen | 414/528 X |
| 4,278,190 | 7/1981 | Dory et al. | 198/311 X |
| 4,658,909 | 4/1987 | McDermott et al. | 172/22 |
| 4,878,800 | 11/1989 | Dell | 414/523 X |
| 4,878,802 | 11/1989 | Hansen et al. | 414/523 |

FOREIGN PATENT DOCUMENTS

| | | | |
|---|---|---|---|
| 149319 | 12/1952 | Australia | 414/528 |
| 2606050 | 5/1988 | France | 198/311 |
| 296218 | 4/1954 | Switzerland | 414/523 |
| 395411 | 7/1933 | United Kingdom | 414/523 |

Primary Examiner—David A. Bucci
Attorney, Agent, or Firm—Martin Smolowitz

[57] ABSTRACT

A green cores collecting apparatus attachable to the rear portion of a corer vehicle comprising a housing provided with a upper laterally extending rotary shaft, a lower laterally extending rotary shaft arranged in parallel with the upper rotary shaft and a rotary elevator located between the upper and lower rotary shaft, the housing being backwardly tilted, and being further provided with a dirt ejecting aperture at its upper rear portion and a soil receiving aperture at its lower front portion, an engine being attached to the housing for driving the rotary elevator and a pair of fitting arms being rotatably fitted to lateral sides of the housing by a pair of shafts so that the fitting arms project forward and at least one of the shafts is removable. Since the fitting arms are securely fitted to the lateral sides of the green corer vehicle locking bolts, the rotary elevator automatically starts its operation as soon as the engine is started.

7 Claims, 7 Drawing Sheets

GREEN CORES COLLECTING APPARATUS

BACKGROUND OF THE INVENTION

1. Field of the Invention

This invention relates to a green cores collecting apparatus and relates more particularly to an apparatus for automatically collecting cores ejected from a green corer vehicle designed to drill and excavate cores from the greens of golf courses for improvement of cultivation of turfs.

2. Prior Art

As illustrated in FIGS. 8 through 10 of the accompanying drawings, a conventional green corer vehicle typically comprises a number of rams 31 located at a rear portion of the vehicle to be moved up and down by an upper crank shaft 32 and a same number of vertical drilling pipes 34, each of which is fitted at the rear end of a fitting member 33 horizontally arranged at the lower end of the corresponding ram 31.

The green corer vehicle 30 can move on the ground G by automotive force of an engine 35, which entails rotary movement of the crank shaft 32 to intermittently move up and down the rams 31 and consequently drills the ground G by the lower end of the drilling pipes 34 fitted to the rams 31.

When such a drilling pipe 34 is driven into the ground G, it is fill with a certain amount of earth 37 in such a manner that the portion of the earth 37 that initially occupies the inside of the pipe 34 is pushed up by the following portion of the earth 37 and produces a core 38 from the upper opening of the drilling pipe 34, which eventually falls on the ground G.

It has been a painstaking work to collect the cores 38 formed and dropped on the ground G.

The inventor of the present invention proposed in Japanese Patent Publication No. 63-105601 a green corer vehicles equipped with an automatic cores collecting apparatus.

A green corer vehicle equipped with an automatic cores collecting apparatus as disclosed in Japanese Patent Publication No. 63-105601 comprises an ejected cores receiving vessel (not shown) attached to the rear end of a corer vehicle as shown in FIG. 8 and comprising a receiving plate and a bucket conveyer (not shown) provided on said plate. Such cores receiving vessels have been popularly used as they save considerably labor for collecting cores scattering on the ground of a golf course.

However, since a corer vehicle requires different drilling pipes with different pipe diameters depending on the size, properties and other factors of the golf course and, when the cores receiver is securely fitted to the rear portion of the vehicle, replacement of drilling pipes in turn requires a very long and painstaking operation.

Therefore, it is an object of the present invention to provide a green cores collecting apparatus which allows easy replacement of drilling pipes and is free from the above mentioned problems.

SUMMARY OF THE INVENTION

According to the invention, the above and other objects of the invention are achieved by providing a green cores collecting apparatus attachable to the rear portion of a corer vehicle comprising a housing provided in it with a upper laterally extending rotary shaft, a lower laterally extending rotary shaft arranged in parallel with said upper rotary shaft and a rotary elevator located between said upper and lower rotary shaft, said housing being backwardly tilted, said housing being further provided with a dirt ejecting aperture at its upper rear portion and a soil receiving aperture at its lower front portion, an engine being attached to the housing for driving said rotary elevator and a pair of fitting arms being rotatably fitted to the lateral sides of said housing by means of a pair of shafts in such a manner that the fitting arms are projecting forward and at least one of said shafts are removable.

With a green cores collecting apparatus having an arrangement as described above, since the fitting arms are securely fitted to the lateral sides of the green corer vehicle by means of locking bolts, the rotary elevator automatically starts its operation as soon as the engine is started. Then, as the drilling pipes reciprocally move up and down and cores are produced from the drilling pipes, they automatically enter the housing through the soil receiving aperture, are subsequently forwarded to the upper end of the housing by the rotary elevator and eventually fall out of the dirt ejecting aperture. When a carrier wagon is placed under the dirt ejecting aperture is tracted by the vehicle, all the produced cores will be fully automatically collected in the wagon, remarkably reducing the requirement of labor needed for collecting cores.

According to the invention, the drilling pipes can be replaced without stopping the coring operation since one of the shafts connecting the fitting arms to the housing can be removed to horizontally swing the housing by more than 90° to expose the drilling pipes, the rams for reciprocating the pipes and the crank shaft as well as the related components to allow replacement of the pipes.

Now the invention will be described in greater detail by referring to the accompanying drawings that illustrate a preferred embodiment of the invention.

DETAILED DESCRIPTION OF THE INVENTION

Figure 1:
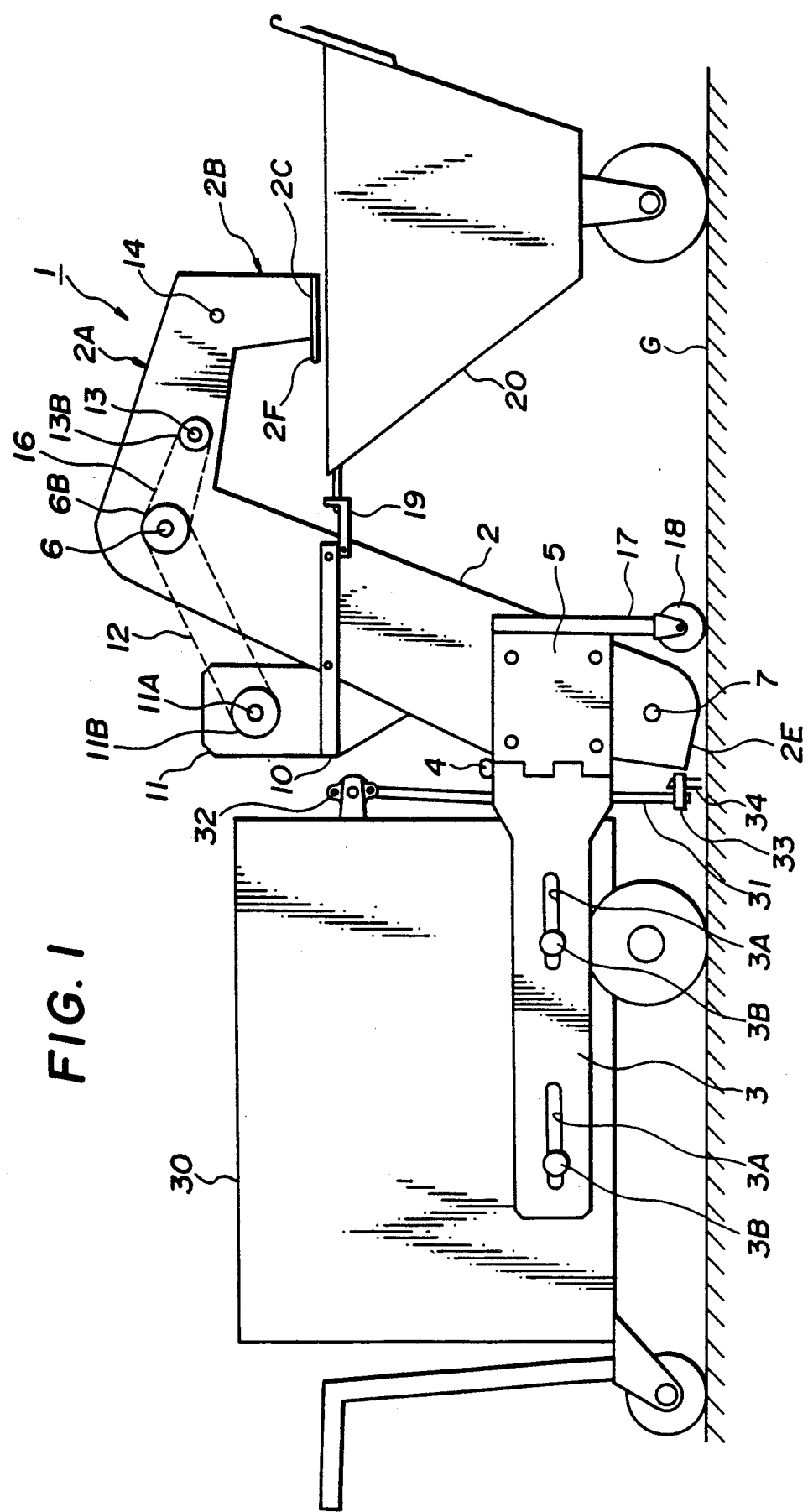
FIG. 1 is a lateral side view of an embodiment of a green cores collecting apparatus according to the invention.
Figure 2:
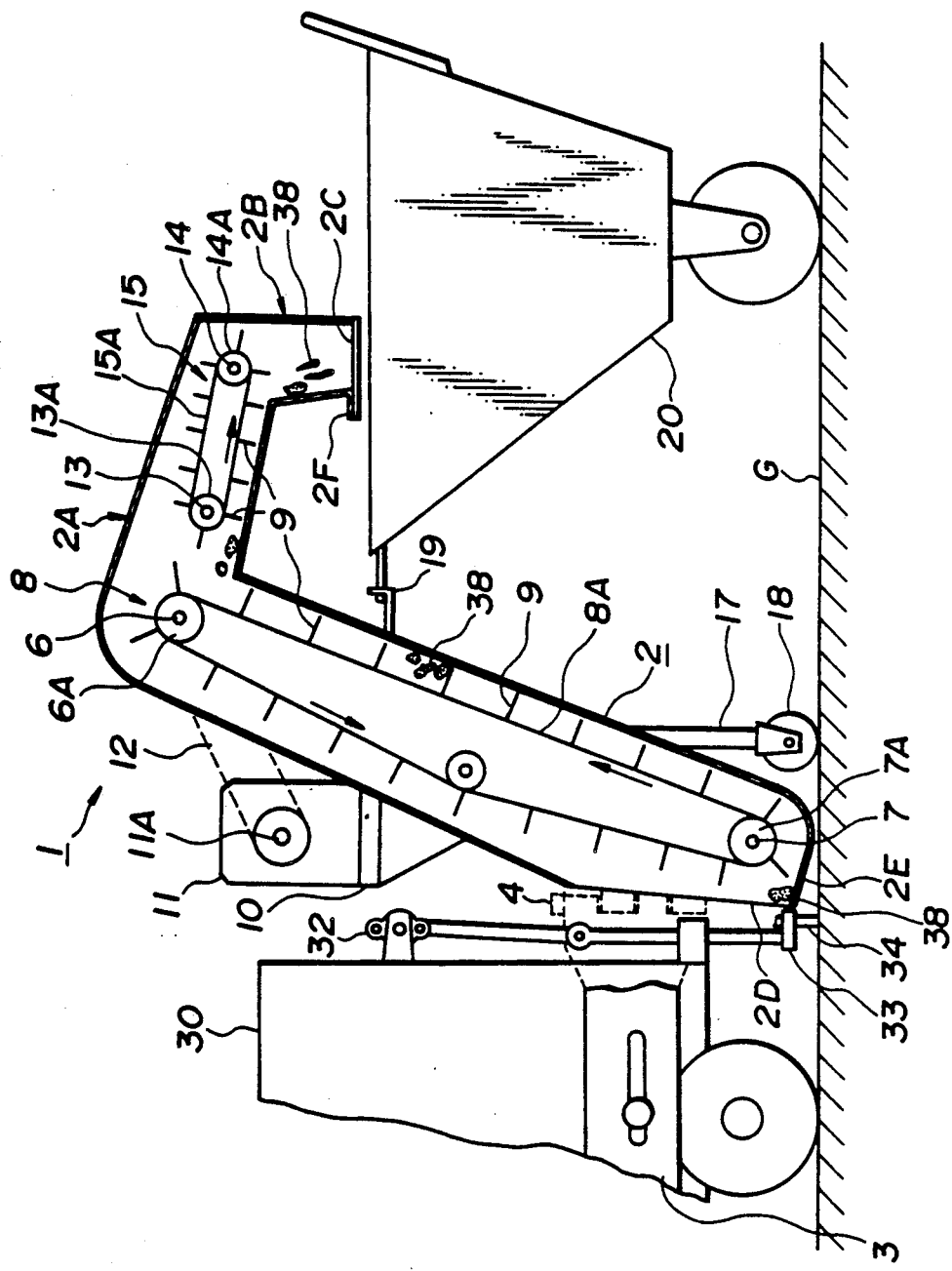
FIG. 2 is a lateral side view of the rotary elevator of the embodiment of FIG. 1.

The green cores collecting apparatus 1 illustrated in FIGS. 1 and 2 comprises a hollow and oblong housing 2 having a rectangular cross section and tilted slightly backward, near the lower end of which there are provided a pair of connecting arms 3, 3 fitted to its lateral sides such that they are projecting forward (leftward in FIGS. 1 and 2) from the housing 2.

More specifically, said connecting arms 3, 3 are respectively horizontally swingably fitted to a pair of fitting plates 5, 5 of the housing 2 by means of a pair of shafts 4, 4, at least one of which is removable. As shown in FIG. 1, each of the connecting arms 3, 3, has a pair of fitting slits 3A, through which a pair of clamping bolts 3B are screwed for rigidly connecting an arm to a lateral side of the green corer vehicle 30.

Figure 4:
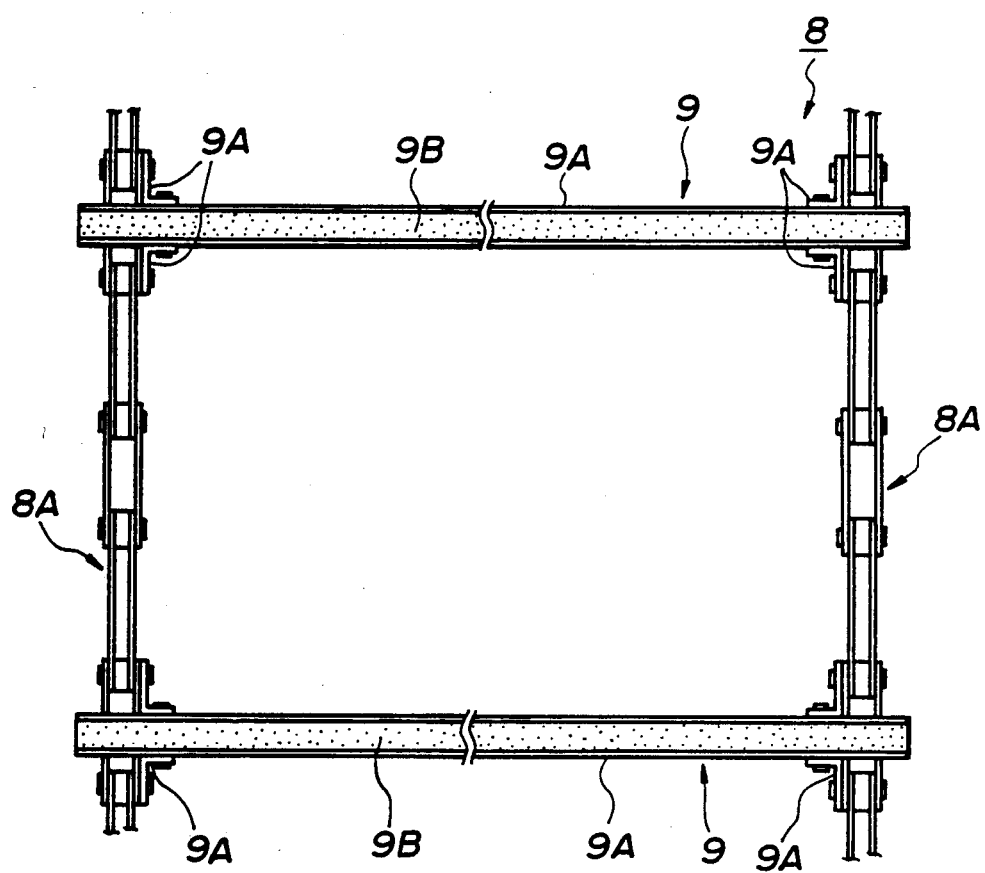
FIG. 4 is a front view illustrating the relationship between the conveyer plates and the lower end portion of the housing of the embodiment of FIG. 1.
Figure 5:
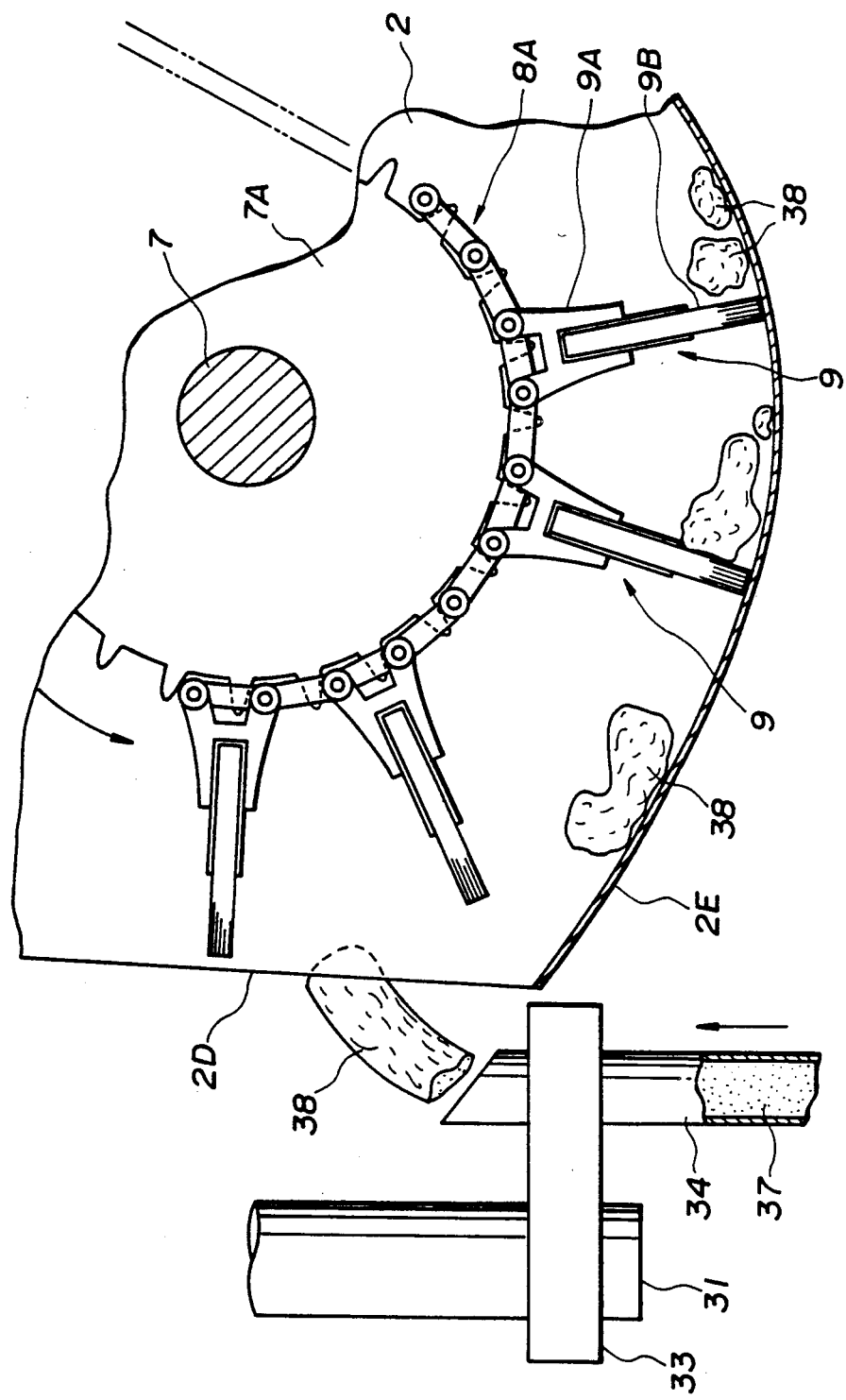
FIG. 5 is a lateral side view illustrating the positional relationship between the lower end portion of the housing and the drilling pipes.

Inside the housing 2, there are provided an upper rotary shaft 6 and a lower rotary shaft 7, respectively, near the upper and lower ends in parallel arrangement (see FIGS. 1 and 2) and a rotary elevator 8 is placed between the rotary shafts 6, 7. The rotary elevator 8 may be configured as a bucket elevator of ordinary type. More specifically, a pair of endless chains 8A, 8A are respectively supported by a pair of sprockets 6A, 6A fitted to the ends of the rotary shaft 6 and another pair of sprockets 7A, 7A fitted to the ends of the rotary shaft 7 to move around them and the lateral ends of each of a number of horizontal conveyer plates 9 are respectively held by said endless chains 8A, 8A by means of a pair of fitting members 9A, 9A, the horizontal conveyer plates being arranged with a predetermined distance between two adjacent ones (see FIG. 4). Each of said conveyer plates 9 is provided with a nylon brush member 9B at is front end in such a manner that it moves brushing the inner wall of the housing 2. While greens G are often formed on a sandy ground area, even when the excavated cores are crushed and reduced to sand within the housing, the nylon bushes 9B can convey the sand upward by brushing the inner wall of the housing 2.

Figure 3:
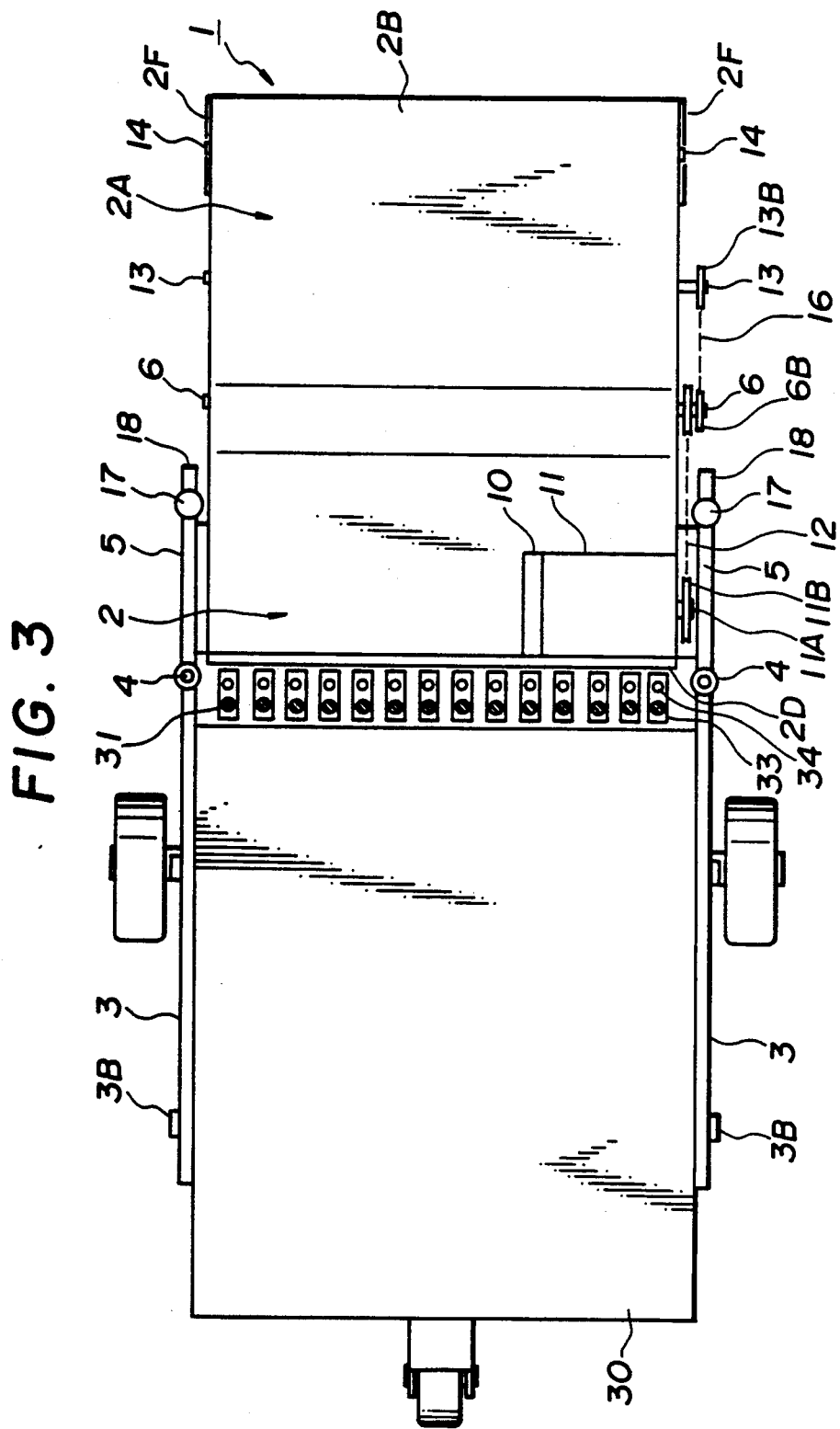
FIG. 3 is a plan view of the fitting arms of the embodiment of FIG. 1.

A shelf 10 is formed on the upper front portion of the housing 2 horizontally projecting therefrom for supporting an engine 11 on it. A V-grooved pulley is rigidly fitted to the output shaft 11A of said engine 11. As shown in FIG. 3, one end of the upper rotary shaft 6 is projecting out of the housing and another V-grooved pulley 6B is rigidly fitted to the projection section of the rotary shaft 6, a V-belt being connecting the two V-grooved pulleys 11B and 6B. Therefore, when the engine 11 started for operation, the rotary shaft 6 is rotated by way of the V-belt 12 to drive the rotary elevator 8.

The housing 2 has a hollow rearward feeder section 2A projecting roughly horizontally backward, the rear end of which is further projected downward to form a core storage area 2B having a dirt ejecting aperture 2C at its lower end. Said dirt ejecting aperture 2C is provided with a sliding shutter 2F.

Said rearward feeder section 2A contains a pair of rotary shafts 13 and 14 arranged in parallel and a bar conveyer 15 provided between the rotary shafts 13 and 14. Said bar conveyer 15 has a configuration roughly same as that of the rotary elevator 8, comprising a pair of endless chains 15A and two pairs of sprockets 13A, 14A as illustrated in FIG. 2. Reference symbol 13B in FIG. 1 denotes a V-groove pulley and reference numeral 16 denotes a V-belt. The bar conveyer 15 is driven along with the rotary elevator 8 when the engine 11 is operated.

An soil receiving aperture 2D is formed at the front end of the housing 2 as shown in FIG. 2. The lower end of the housing constitutes a receiving plate 2E, whose front edge is located very close to the rear end of the fitting member 33 of the drilling tube 34 of the green corer 30 at a level approximately same as the lower limit of the movable range of the upper surface of the fitting member 33.

A pair of leg members 17, 17 are respectively fitted to the rear ends of the fitting plates 5, 5 arranged at the lateral sides of said housing 2, and provided respectively with a pair of casters 18, 18. Said casters 18, 18 bear the weight of the rear portion of the housing 2 when it is fitted to the green corer vehicle 30 and further bear the total weight of the housing 2 when it is swung around one of the shafts 4.

Reference numeral 19 in FIGS. 1 denotes a connector for tracting a carrier wagon 20.

With an embodiment having a configuration as described above, the green cores collecting apparatus 1 is fitted to the rear of the corer vehicle 30 by securely fitting the fitting arms 3, 3 to the sides of the green corer vehicle 30.

When the engine 11 is started for operation of the green corer vehicle 30, the rotary elevator 8 and the bar conveyer 15 rotate counterclockwise or in the direction indicated by arrows in FIG. 2. As the corer vehicle 30 performs its operation of coring, the drilling pipes 34 reciprocally move up and down to excavate cores 38 from the ground G and ejects the excavated cores 38 toward the back of the vehicle 30. Then the ejected cores 38 are received by the receiving plate 2E through the soil receiving aperture 2D and pushed backward and then upward along the rear wall of the housing 2 by the conveyer plates 9 of the rotary elevator 8. When the cores 38 reach the upper end of housing 2, they are ejected backward onto the rearward feeder section 2A. Thus, the cores 38 that arrive to the rearward feeder section 2A are then moved backward by the bar conveyer 15 and through into the carrier wagon 20 by way of the dirt ejecting aperture 2C.

When the carrier wagon 20 becomes full of cores 38, it has to be replaced by a new wagon 20, during which the sliding shutter 2F is kept closed. However, such a replacing operation can be carried out without stopping the operation of the corer vehicle 30, as the newly collected cores 38 are temporarily stored in the core storage area 2B until a new carrier wagon 20 is placed in position and the shutter 2F is reopened to allow the cores 38 stored in the temporary storage area 2B to fall into the new carrier wagon 20.

When any of the drilling pipes 34 of the corer vehicle 30 are to be replaced while the vehicle is stopped, the shaft 4 of one of the fitting arms 3 is removed so that the housing 2 is swung around the other shaft horizontally by more than 90°. Under such condition, the drilling pipes 34 can be replaced and the sections related with the crank shaft 32 can be inspected without difficulty. It should be noted that the casters 18 provided under the housing 2 serve for safe and stable rotation of the housing 2.

When the inspection is over, the housing 2 can be returned to its proper position by swinging it around the remaining shaft 4 and, when the housing 2 is returned to the proper position, the removed shaft 4 can be returned to the connector section between the arm 3 and fitting plate 5 without difficulty.

As is apparent from the above description, since a core collecting apparatus 1 according, to the invention comprises a housing 2 provided with a pair of fitting arms 3, 3 on its lateral sides for fitting the housing to the green corer vehicle 30, said fitting arms being swingably fitted to the housing 2 by means of a pair of shafts 4, 4 and at least one of said shafts 4, 4 being removable, the housing 2 can be horizontally swung by more than 90°, allowing the drilling pipes 34 located at the rear end of the green corer vehicle to be replaced and other related operations to be conducted without difficulty. Moreover, since a core storage area 2B is formed above the ejector aperture of the housing 2, the operation of the green corer vehicle does not need to be stopped for replacement of the carrier wagon 20, making the operation particularly advantageous.

While the present invention is described with reference to a particular embodiment thereof, it is not by any means limited thereto and any modifications and/or variations thereof may be allowed within the scope of the invention. For example, while the embodiment comprises a bar conveyer 15 within the rearward feeder section 2A, it may be omitted by considerably tilting the bottom of the rearward feeder section 2A. Similarly, the brushes attached to the horizontal conveyer plates 9 of the rotary elevator 8 may be omitted when the horizontal conveyer plates 9 are made from so many plastic plates or they are replaced by specifically designed buckets. Moreover, said receiving plate 2E may be realized in the form of a sieve for allowing fine sand particles to fall on the ground G therethrough.

Figure 6:
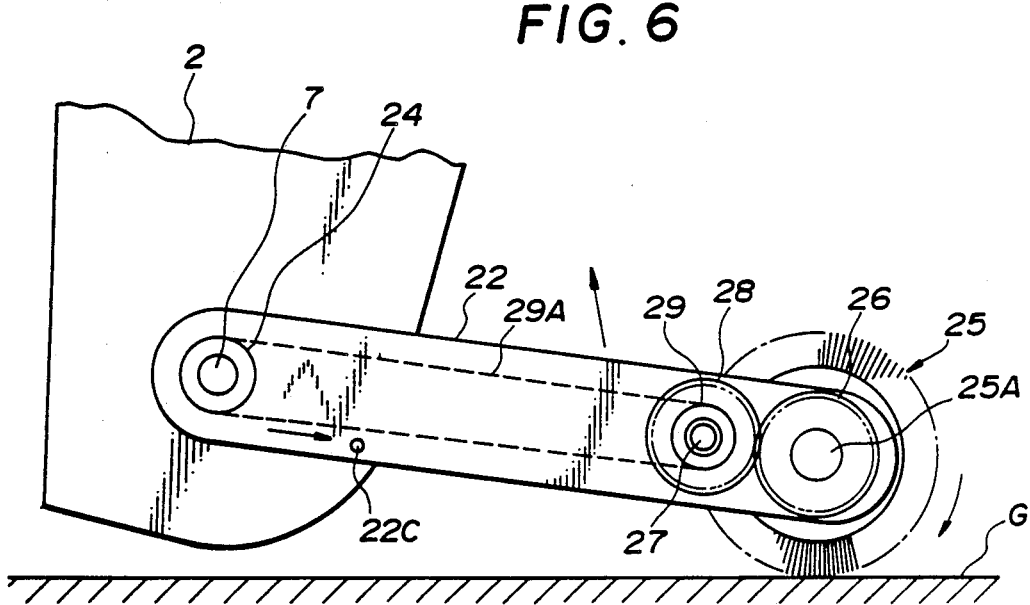
FIG. 6 is a side view of an adjuster wheel.
Figure 7:
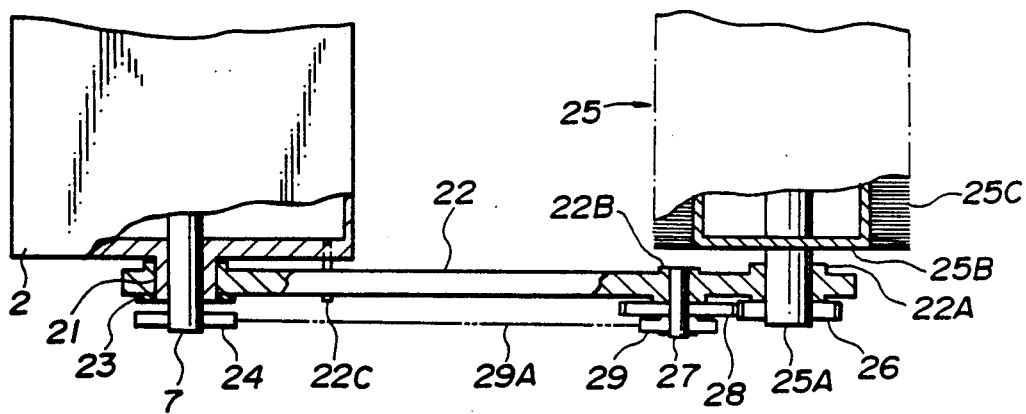
FIG. 7 is a plan view illustrating the relationship between the adjuster wheel and the housing.
Figure 8:
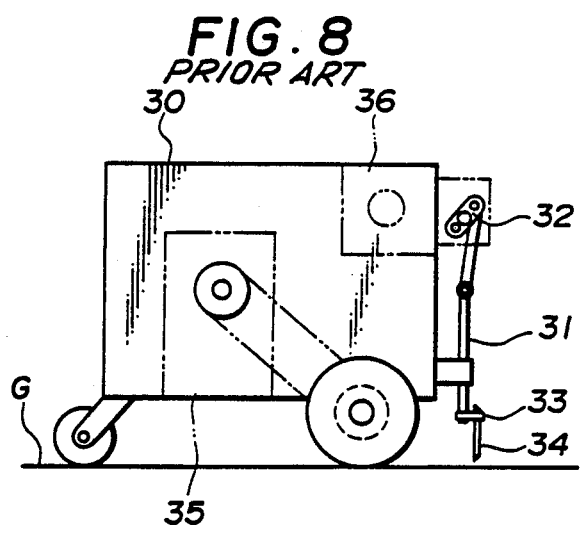
FIG. 8 is a side view of a conventional corer vehicle.
Figure 9:
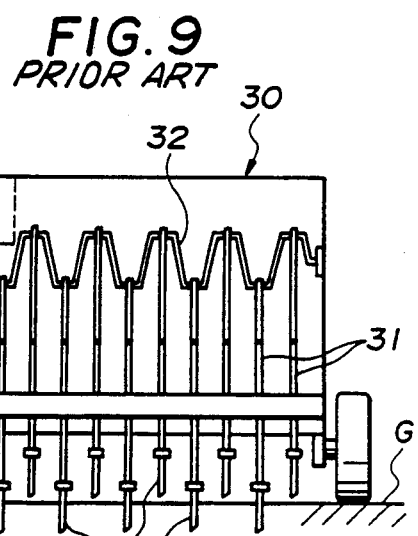
FIG. 9 is a rear view of the vehicle of FIG. 8.
Figure 10:
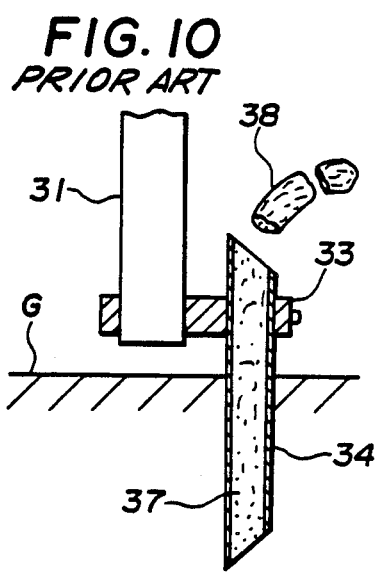
FIG. 10 is a side view of a drilling pipe of the vehicle of FIG. 8.

FIGS. 6 and 7 respectively show a side view and a plan view of the essential area of the lower part of the housing 2, illustrating how an adjuster wheel is fitted to the housing.

The lateral rotary shaft bearing sections 21 of the housing are laterally projecting from the side walls of the housing 2, and the both ends of the rotary shaft 7 are slightly projecting out of the respective bearings 21. A pair of wheel supporting rods 22 are respectively engaged with the outer peripheries of the bearing sections 21 with their front end portions vertically movable. The levers are prevented from unintentional removable by means of a pair of locking washers.

A pair of sprockets 24 are rigidly fitted to the both ends of the rotary shafts 7.

The front end of each of the wheel supporting rods 22 constitutes a bearing 22A for receiving the shaft 25A of the adjuster wheel 25. The both ends of the wheel shaft 25A are projecting out of the respective bearings 22A, a transmission gear 26 being rigidly fitted to one of the front ends.

An auxiliary bearing 22B is also formed in the vicinity of said bearing 22A of each of said wheel supporting rods 22 for receiving a short shaft 27, to which a transmission gear 28 and a sprocket 29 are securely fitted.

Said transmission gears 26 and 28 are engaged with each other and a transmission chain 29A is provided for connecting the sprocket 29 and the sprocket 24 for the lower rotary shaft 7. Said adjuster wheel 25 is realized by firmly attaching a brush 25C around a drum 25B.

With such an arrangement, when the rotary elevator 8 is moved counterclockwise as indicated in FIG. 2, the rotary movement is transmitted from the sprocket 24 of the rotary shaft 7 to the wheel 25 by way of the endless chain 29A, the sprocket 29 and the transmission gears 28 and 26 to rotate the adjuster wheel 25 clockwise or in the direction opposite to the direction of rotation of the rotary elevator 8 to consequently move forward, brushing the surface of the ground G.

Thus, the adjuster wheel 25 evenly levels the surface of the ground G by brushing any fine ripples formed around the bores drilled by the drilling pipes 34 and/or dirts formed by crushed and fallen cores.

Since the wheel supporting rods 22 are rotatable around the bearings 21, the adjuster wheel 25 may be held upward when it is not necessary to use it. Reference symbol 22C FIGS. 6 and 7 denotes a stopper pin for holding the wheel. Said adjuster wheel 25 may be replaced by a rubber roller or a combination of a roller wheel and a brush wheel.

A green cores collecting apparatus 1 according to the invention has the following effects.

(a) Since such a core collecting apparatus is swingable around either one of a shaft pair arranged on the housing and either one or both of the shaft pair are removable, the fitting arms can be rigidly fitted to the green corer vehicle and the housing can be horizontally swung around one of the shafts by more than 90° by simply removing the other shaft. Consequently, replacement of the drilling pipe and other related maintenance operations of the green corer vehicle can be conducted efficiently and without difficulty.

(b) When a hollow rearward feeder section is provided in the upper rear part of the housing, the collected cores can be allowed to fall without constructing a very high rotary elevator.

(c) When a core storage area is formed in the upper rear part of the housing and above the dirt ejecting aperture and a sliding shutter is provided at the dirt ejecting aperture, the carrier wagon can be replaced without stopping the operation of the corer vehicle by simply closing the shutter.

(d) When the receiving plate at the lower end of the housing is made of a sieve, fine particles of earth can be promptly returned to the ground.

(e) When casters are provided at the lower rear end of the housing, the swinging shafts of the housing are relieved from any unexpected loads applied to the shafts at the time of swinging the housing around one of the shafts.

(f) When a adjuster wheel is provided by way of a pair of rotatable wheel supporting rods connected to the lower rear end of the housing, the surface of the ground areas where cores are removed can be evenly leveled by the brush of the wheel, which can be held standing upward when it is not in use for preventing any harmful effects that the transmission system including gears and shafts may be subjected to.

What is claimed is:

1. A green cores collecting apparatus attachable to a rear portion of a corer vehicle comprising a housing provided with an upper laterally extending rotary shaft, a lower laterally extending rotary shaft arranged in parallel with said upper rotary shaft, a rotary elevator located between said upper and said lower rotary shaft, said housing being backwardly tilted, said housing being further provided with a dirt ejecting aperture at its upper rear portion and a soil receiving aperture at its lower front portion, an engine attached to the housing for driving said rotary elevator, a pair of fitting arms rotatably fitted to lateral sides of said housing by a pair of shafts so that the fitting arms project forward and at least one of said shafts is removable, a pair of outwardly projecting bearings formed at lateral ends of the lower rotary shaft, a pair of wheel supporting rods for supporting an adjuster wheel respectively engaged with the outer peripheries of said bearings, said adjuster wheel upwardly rotatably arranged between said rods, and a transmission system arranged between said lower rotary shaft and the shaft of said adjuster wheel for driving said adjuster wheel by rotation of said lower rotary shaft.

2. A green cores collecting apparatus according to claim 1, wherein a hollow rearward feeder section is formed at the upper rear portion of said housing and a cylindrical core storage area provided with a dirt ejecting aperture equipped with a sliding shutter is formed at a rear lower end of said rearward feeder section.

3. A green cores collecting apparatus according to claim 1, wherein a bar conveyer is installed in a rearward feeder section located at the upper rear end of said housing.

4. A green cores collecting apparatus according to claim 1, wherein a number of casters are provided near a lower rear end portion of said housing.

5. A green cores collecting apparatus according to claim 2, wherein a bar conveyor is installed in a rearward feeder section located at the upper end of said housing.

6. A green cores collecting apparatus according to claim 2, wherein a number of casters are provided near the lower rear end portion of said housing.

7. A green cores collecting apparatus according to claim 3, wherein a number of casters are provided near the lower rear end portion of said housing.

* * * * *